US010513361B2

(12) United States Patent
Badini et al.

(10) Patent No.: US 10,513,361 B2
(45) Date of Patent: Dec. 24, 2019

(54) DEVICE FOR JOINING FILTER BAGS WITH INFUSION PRODUCTS

(71) Applicant: I.M.A. INDUSTRIA MACCHINE AUTOMATICHE S.p.A., Ozzano Dell'Emilia (Bologna) (IT)

(72) Inventors: Simone Badini, Ozzano Dell'Emilia (IT); Sauro Rivola, Ozzano Dell'Emilia (IT)

(73) Assignee: I.M.A. INDUSTRIA MACCHINE AUTOMATICHE S.p.A., Ozzano Dell'Emilia (IT)

( * ) Notice: Subject to any disclaimer, the term of this patent is extended or adjusted under 35 U.S.C. 154(b) by 0 days.

(21) Appl. No.: 16/326,839

(22) PCT Filed: Sep. 4, 2017

(86) PCT No.: PCT/IB2017/055303
§ 371 (c)(1),
(2) Date: Feb. 20, 2019

(87) PCT Pub. No.: WO2018/047051
PCT Pub. Date: Mar. 15, 2018

(65) Prior Publication Data
US 2019/0210753 A1    Jul. 11, 2019

(30) Foreign Application Priority Data
Sep. 6, 2016 (IT) .................. 102016000090075

(51) Int. Cl.
*B32B 37/00* (2006.01)
*B65B 51/30* (2006.01)
(Continued)

(52) U.S. Cl.
CPC ............ *B65B 51/306* (2013.01); *B29C 65/02* (2013.01); *B29C 66/1122* (2013.01);
(Continued)

(58) Field of Classification Search
USPC ....................................... 156/583.1
See application file for complete search history.

(56) References Cited

U.S. PATENT DOCUMENTS 5,421,924 A * 6/1995 Ziegelhoffer ..... A61F 13/15739
156/290
6,309,487 B1 * 10/2001 Herrin ............... A61F 13/15593
156/290

FOREIGN PATENT DOCUMENTS

DE  29607449 U1  8/1996
DE  10126202 A1  12/2002
(Continued)

OTHER PUBLICATIONS

International Search Report and Written Opinion dated Dec. 1, 2017 for counterpart PCT Application No. PCT/IB2017/055303.

*Primary Examiner* — James D Sells
(74) *Attorney, Agent, or Firm* — Shuttleworth & Ingersoll, PLC; Timothy J. Klima

(57) ABSTRACT

A device for joining filter bags includes two operating units located on opposite sides of a continuous tubular strip of filter material movable along a feed direction; each operating unit includes a supporting body, a sealing head connected to the supporting body and two kinematic units equipped with a corresponding eccentric rotary system for moving the supporting body along a first trajectory and to move the sealing head between a position of contact with the strip and a position away from the strip; each operating unit includes a carriage associated with the sealing head for and slidably connected to the supporting body to translate in both directions along a second trajectory.

8 Claims, 8 Drawing Sheets

(51) Int. Cl.
  *B29C 65/00* (2006.01)
  *B29C 65/02* (2006.01)
  *B65B 29/02* (2006.01)
  *B29L 31/00* (2006.01)
  *B65B 9/20* (2012.01)

(52) U.S. Cl.
  CPC .... *B29C 66/4312* (2013.01); *B29C 66/81419* (2013.01); *B29C 66/82265* (2013.01); *B29C 66/83543* (2013.01); *B29C 66/849* (2013.01); *B65B 29/028* (2017.08); *B29L 2031/7122* (2013.01); *B65B 9/20* (2013.01)

(56) References Cited

FOREIGN PATENT DOCUMENTS

EP 2644514 A1 10/2013
JP S6396003 A 4/1988

\* cited by examiner

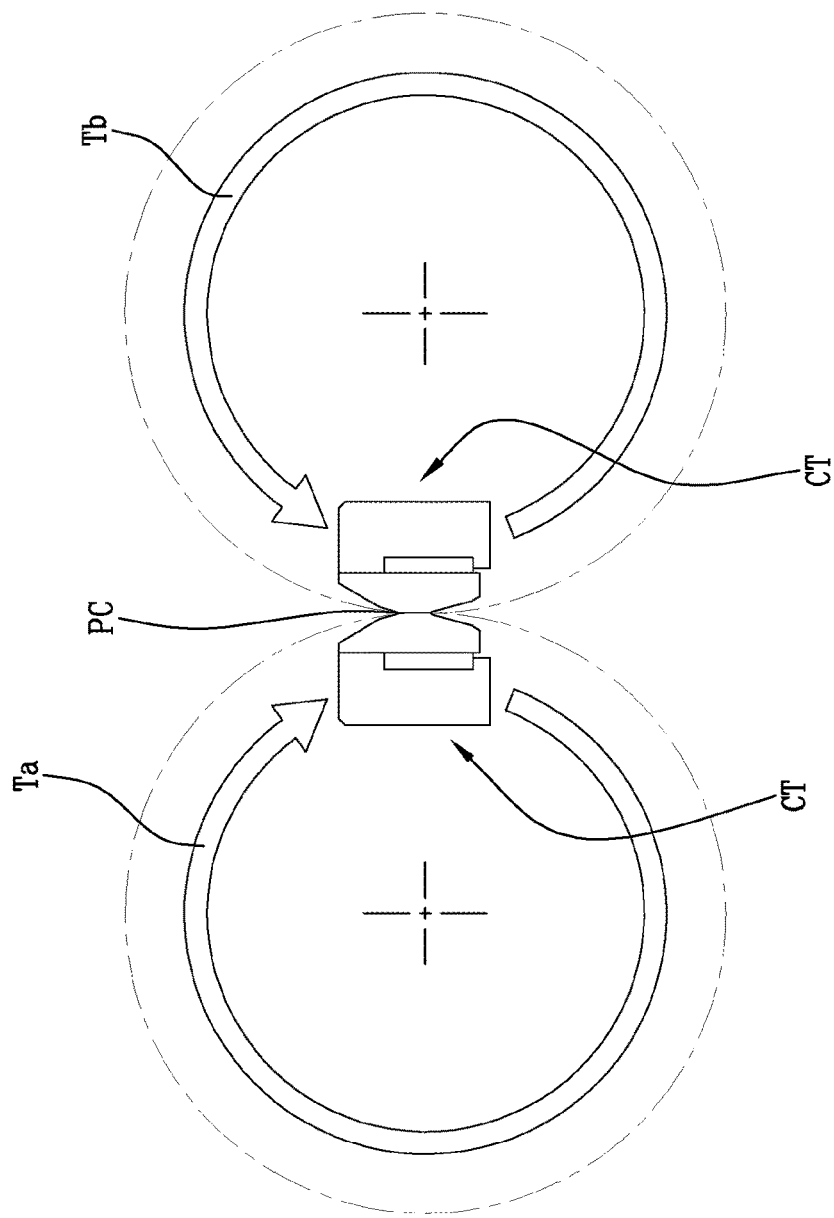

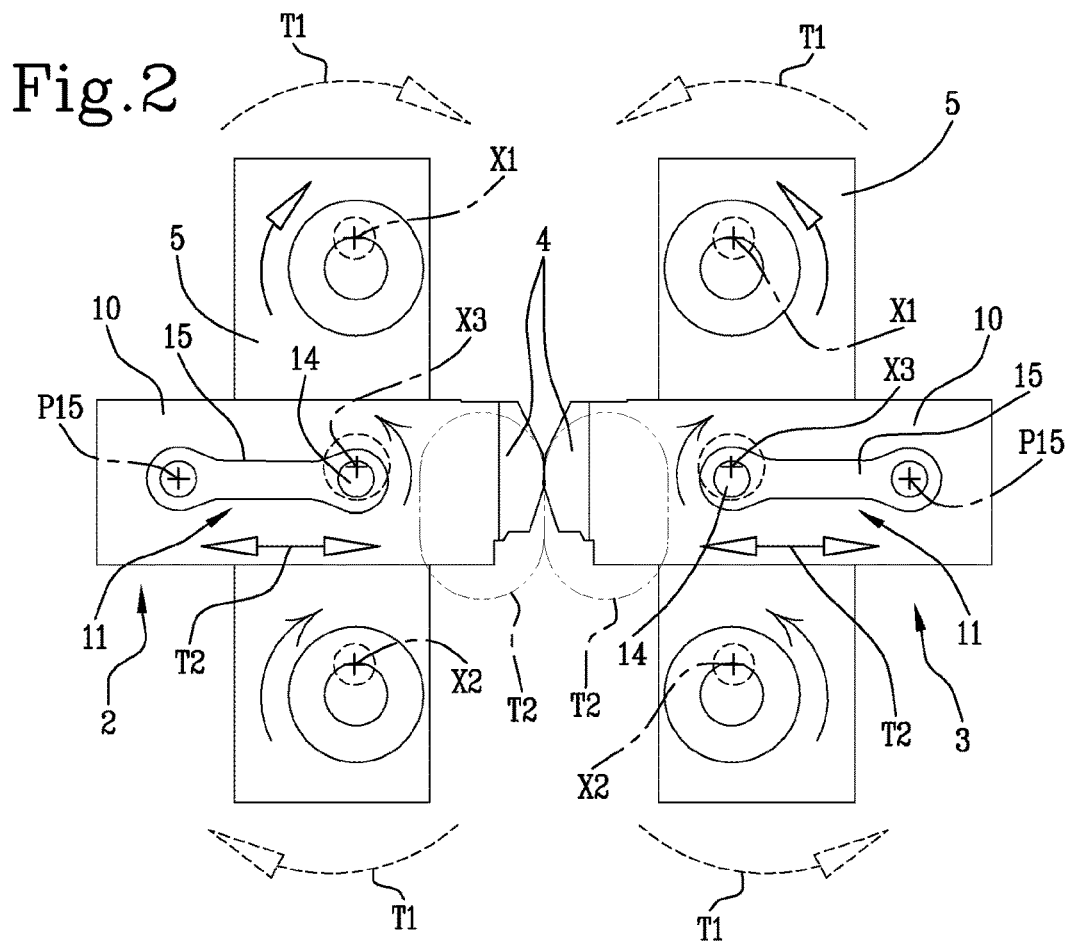
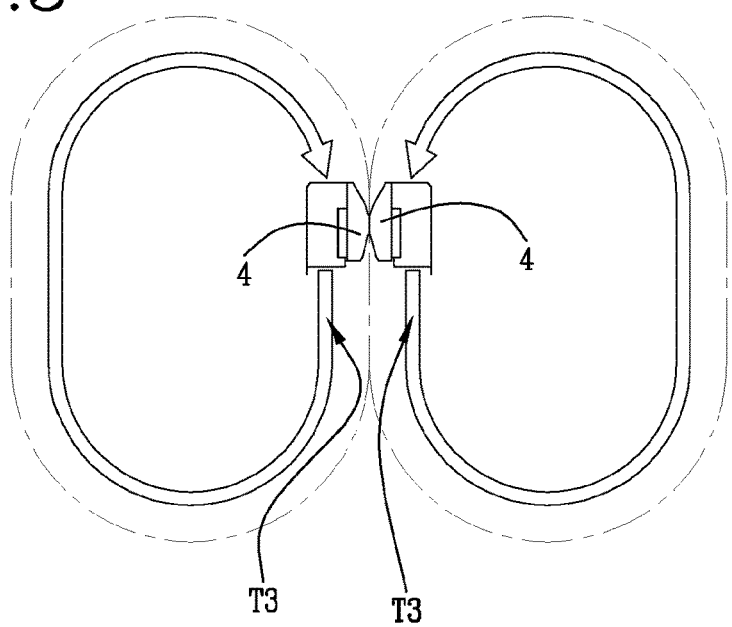

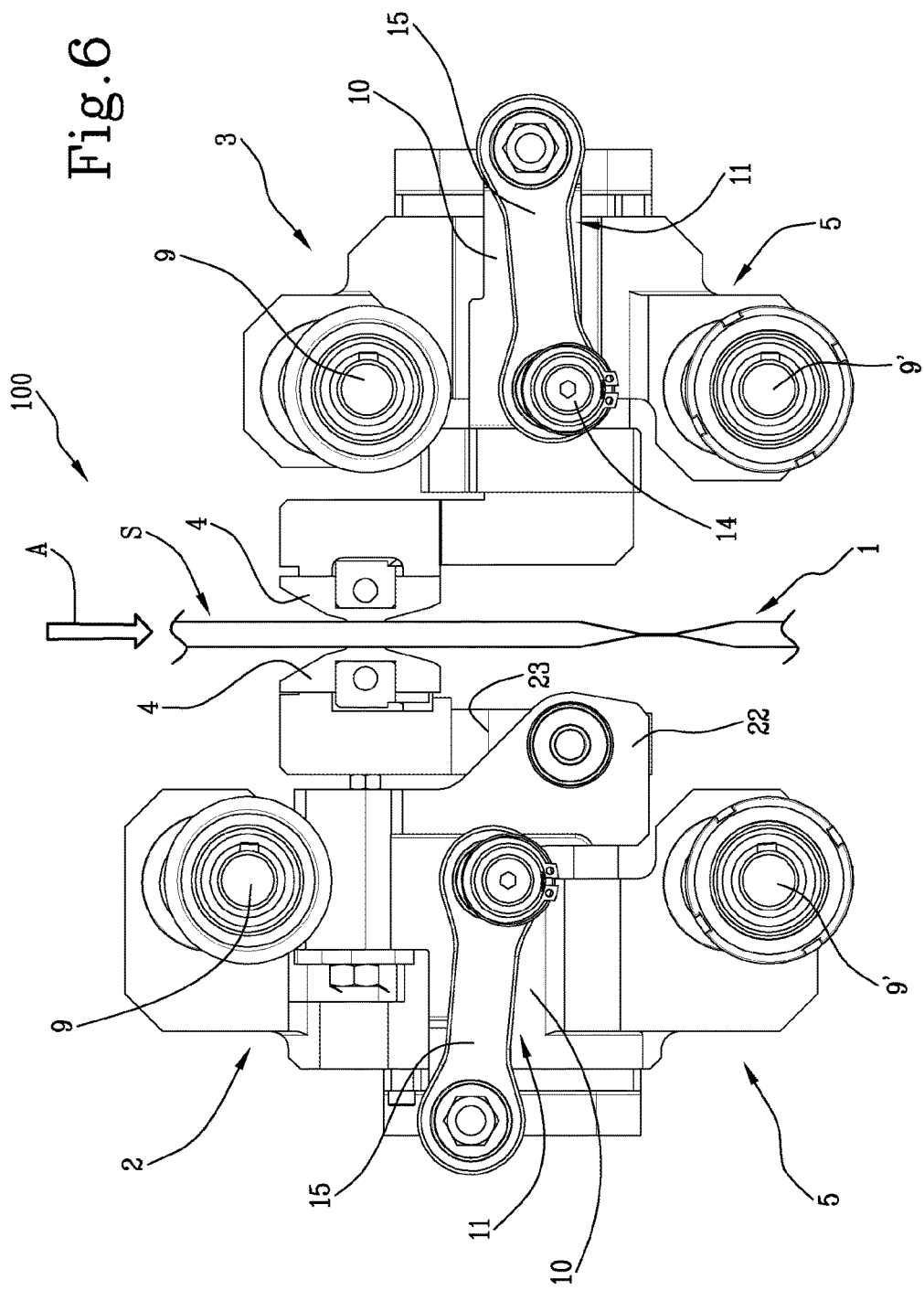

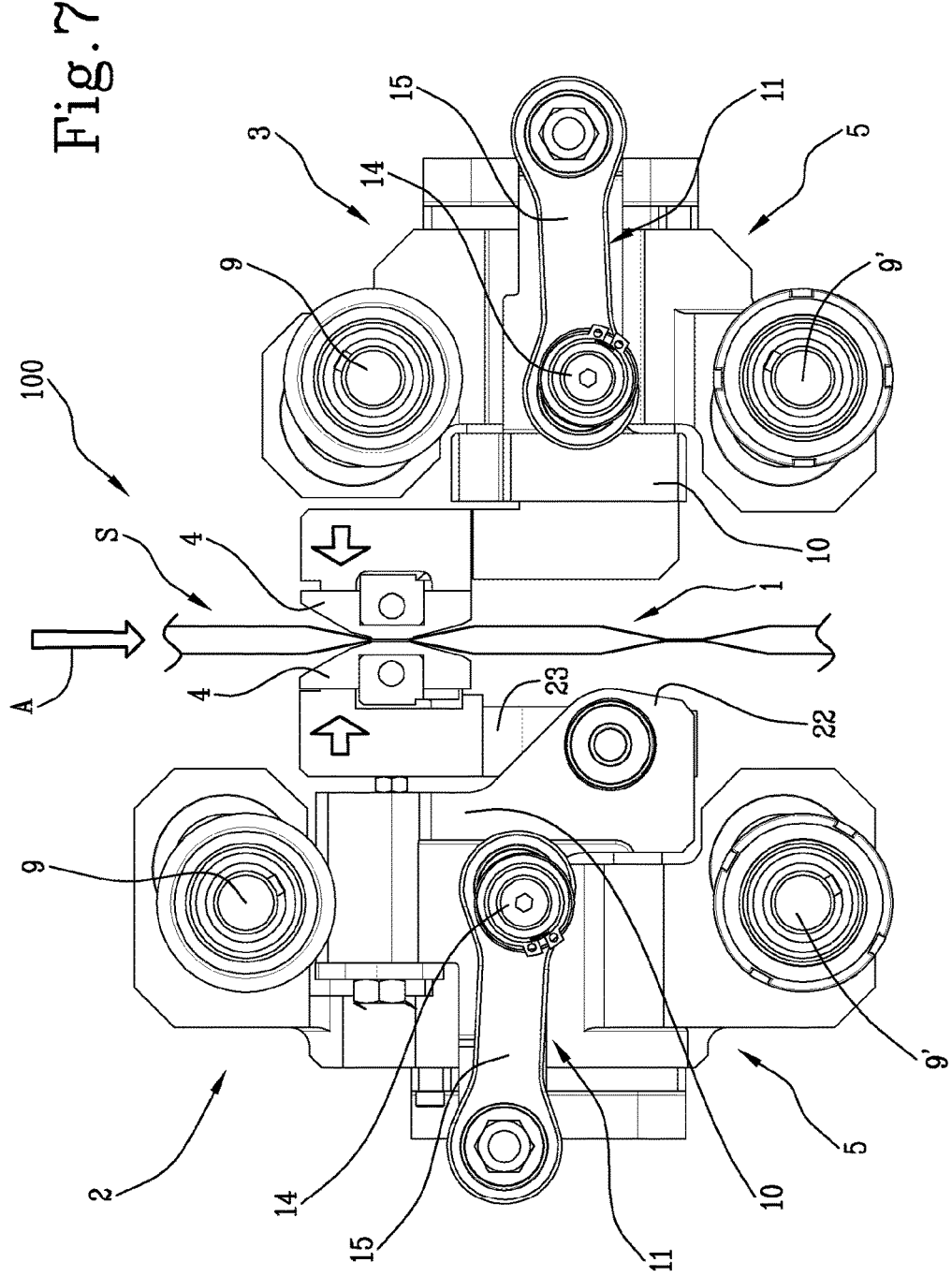

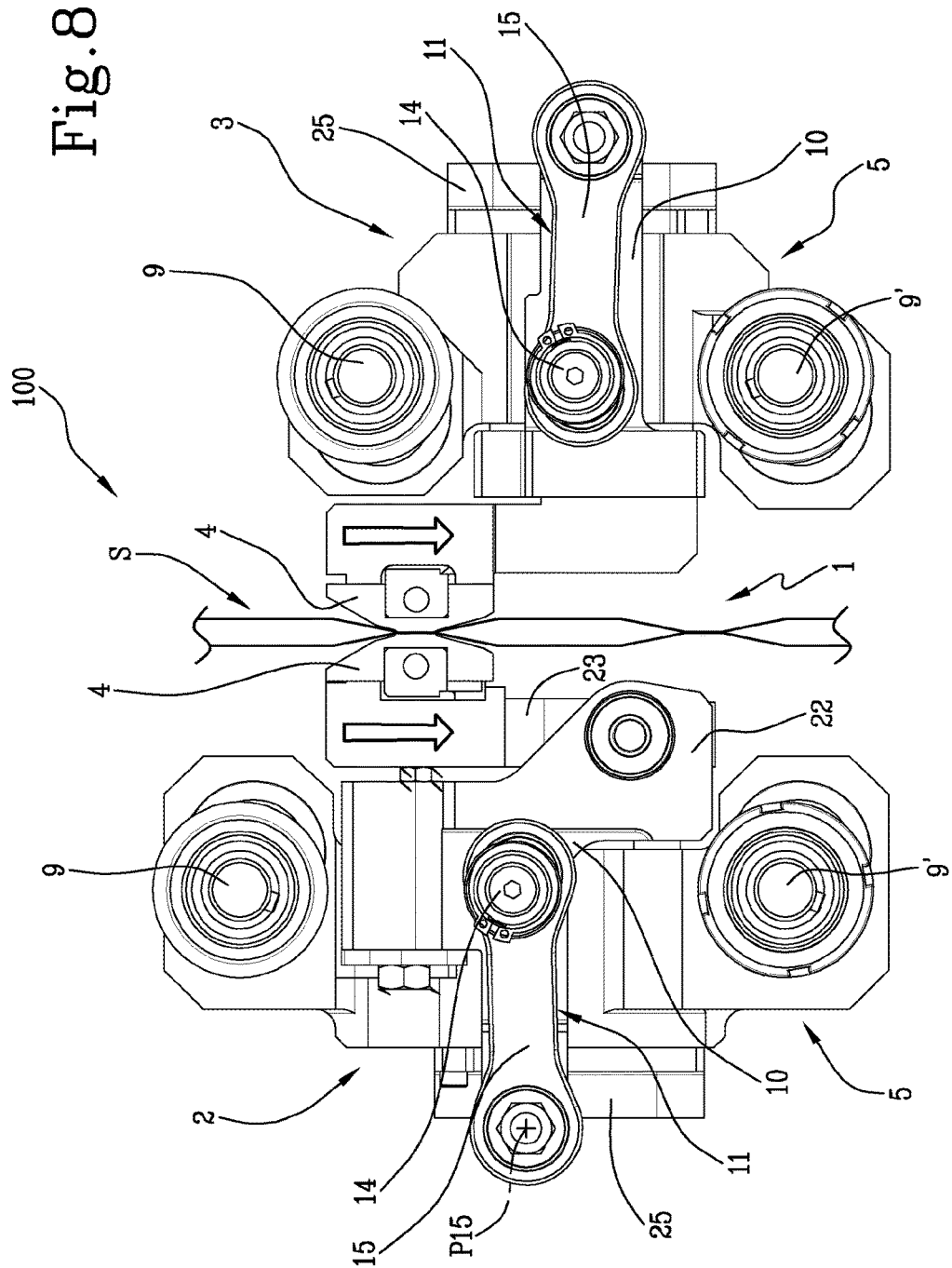

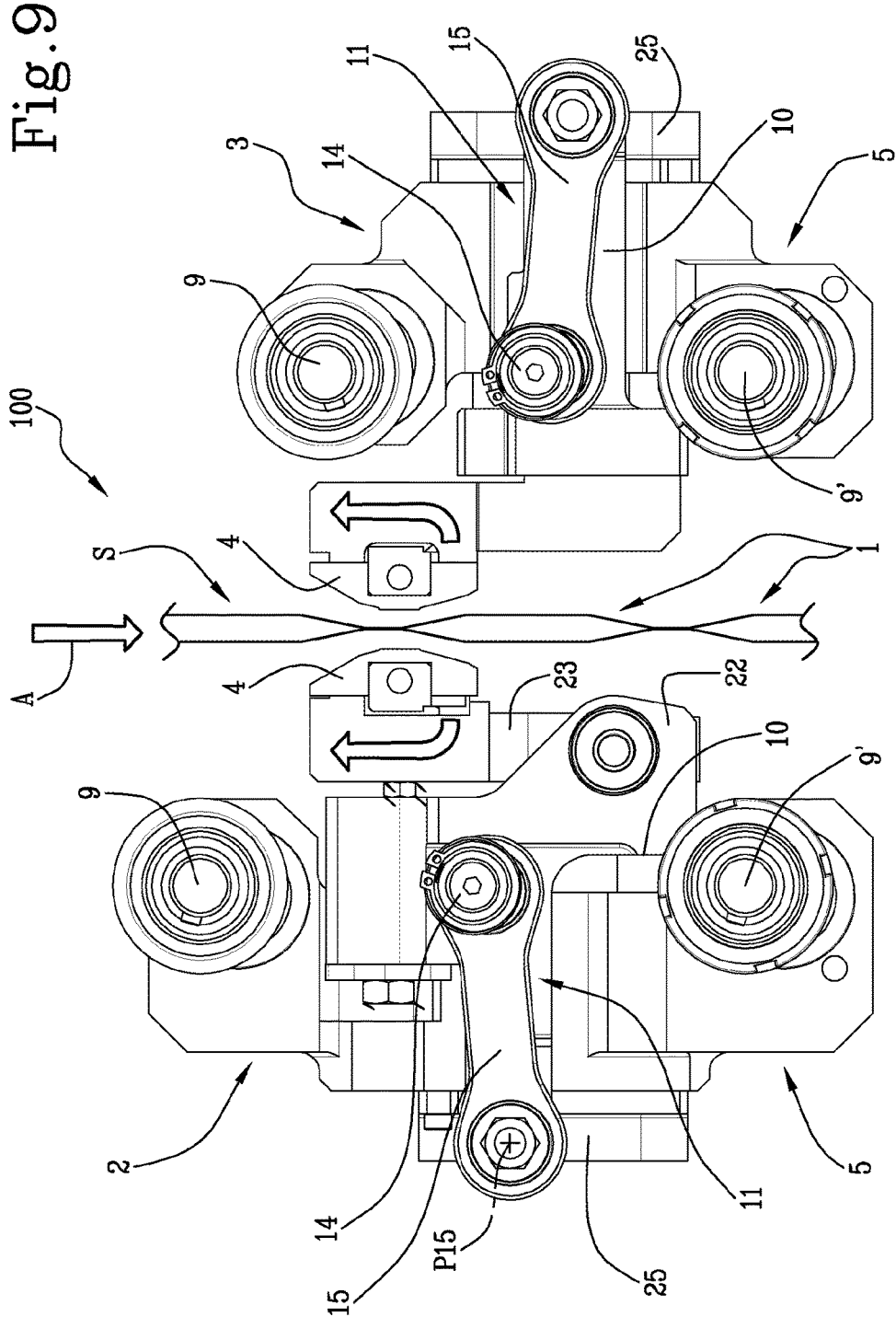

DEVICE FOR JOINING FILTER BAGS WITH INFUSION PRODUCTS

This application is the National Phase of International Application PCT/IB2017/055303 filed Sep. 4, 2017 which designated the U.S.

This application claims priority to Italian Patent Application No. 102016000090075 filed Sep. 6, 2016, which application is incorporated by reference herein.

TECHNICAL FIELD

This invention relates to a device for joining filter bags, in particular a device for joining filter bags applied to automatic machines for the production of filter bags for infusion products, such as, for example, tea, coffee, chamomile and the like.

BACKGROUND ART

Joining devices are known which comprise two operating units, each having a sealing head for sealing (usually, but not necessarily, of the hot-melt type) bottom and/or top ends of filter bags of various types, such as, for example, traditional single-lobed bags, two-lobed bags, bags of tetrahedral shape, etc.

It should be noted that the joining devices are used on machines comprising stations (operating, preferably, but not necessarily, continuously) which are able to form continuous strips of filter material with a tubular shape feeding along a feed direction (horizontal or vertical) into which, at predetermined intervals, a dose of infusion product is placed.

Some examples of prior art joining devices are illustrated in patent documents JP S63 96003, DE 101 26 202, DE 296 07 449 U1 and EP 2 644 514.

These joining devices join a portion of tubular strip which defines a top of a filter bag being formed and a bottom of a next filter bag. More in detail, the sealing heads of the joining devices cyclically move towards each other until coming into contact with the portion of tubular strip and move away until detaching from the tubular strip, performing seals transversal to the tubular strip arranged at regular intervals. The sealing heads are located on opposite sides and transversally to the tubular strip of filter material being fed.

Each sealing head is connected to a supporting body which, in turn, is constrained to a kinematic unit; the kinematic unit moves the supporting body and the sealing head.

Each kinematic unit comprises two axes of rotary movement (of which at least one is motor driven and synchronised with the movement for feeding the tubular strip of filter material), usually arranged side by side with respect to a horizontal plane or a vertical plane, for each supporting body-sealing head unit.

On each of the axes of rotary movement is keyed an eccentric rotary system consisting of a circular plate having a protruding shaft positioned outside the geometrical centre of the circular plate to form a crank system.

Each supporting member is articulated to the eccentric rotary system in such a way as to rotate about the two axes of rotary movement according to a circular trajectory (clockwise or anti-clockwise) and able to move the joining head with an alternating motion towards and away from the continuous strip of filter material at least between an operating position in contact with the tubular strip of filter material and a non-operating position away from the strip of filter material.

As may be noted in FIG. 1, the circular trajectories Ta and Tb of the two supporting body-sealing head units CT define a point of contact PC (which corresponds to a transversal joining zone of the continuous tubular strip of filter material) at the point of tangency of the trajectories of movement Ta and Tb.

However, the joining devices described above have a disadvantage: the sealing heads remain in contact with the continuous tubular strip of filter material for a very short sealing time.

In effect, the sealing heads are effectively in operational contact with the continuous tubular strip of filter material at a single point of contact PC (corresponding to the point of tangency of the circular trajectories Ta and Tb) for a reduced time and this may determine joins defective or insufficient joins/seals in particular on machines having high production speeds.

DISCLOSURE OF THE INVENTION

The aim of this invention is therefore to provide a device for joining filter bags for infusion products which is able to overcome the above-mentioned drawbacks.

More specifically, the aim of this invention is to provide a device for joining filter bags for infusion products which is able to operate with high flexibility, at a high operating speed and with a high level of reliability.

A further aim of this invention is to provide a device for joining filter bags for infusion products which is capable of obtaining high quality joins on the strip of filter material.

These aims are achieved by a device for joining filter bags for infusion products according to the present disclosure. Preferred embodiments of the invention are presented herein.

A device for joining filter bags according to the invention comprises two operating units located on opposite sides of a continuous tubular strip of filter material movable along a feed direction.

Each operating unit comprises a supporting body and a sealing head, connected to the supporting body.

The joining device according to the invention comprises two kinematic units equipped with a corresponding eccentric rotary system. Each kinematic unit is connected to a respective supporting body. The eccentric rotary system is able to move the respective supporting body along a first trajectory to move the sealing head between a position of contact with the strip and a position away from the strip.

Each operating unit also comprises a carriage associated with the sealing head and slidably connected to the supporting body. The carriage is configured to be able to translate in both directions relative to the supporting body along a second rectilinear trajectory, advantageously perpendicular to the feed direction.

Each operating unit also comprises a second kinematic unit articulated to a third axis of movement and to the carriage for moving the carriage in a synchronised fashion with the supporting body, thus obtaining a third trajectory of the sealing head resultant from the combination of the first trajectory and the second rectilinear trajectory. According to the invention, the third trajectory comprises a rectilinear stretch which is parallel to the feed direction at the position of contact of the sealing head.

Each operating unit therefore is equipped with a combination of two different components movable in a synchronised fashion with each other, through the agency of a kinematic mechanism, which is able to generate a cyclical movement of the sealing head resulting from the interaction of the two individual trajectories performed by the supporting body and by the carriage: this allows the sealing heads to remain in contact with the continuous tubular strip of filter material (following each other) for sufficient time to perform a correct joining on the continuous tubular strip.

BRIEF DESCRIPTION OF THE DRAWINGS

Further features of the invention will become more apparent from the following detailed description of a preferred, non-limiting embodiment of it, with reference to the accompanying drawings, in which:

FIG. 1 shows an operational diagram of a joining device for filter bags of known type;

FIG. 2 shows a schematic front view of a kinematic diagram of the device for joining filter bags for infusion products according to this invention;

FIG. 3 shows a scaled-up schematic front view of an operating diagram of sealing heads referred to FIG. 2;

FIGS. 6 to 9 show front views, with some parts cut away in order to better illustrate others, of successive operating steps of the joining device.

DETAILED DESCRIPTION OF PREFERRED EMBODIMENTS OF THE INVENTION

Figure 4:
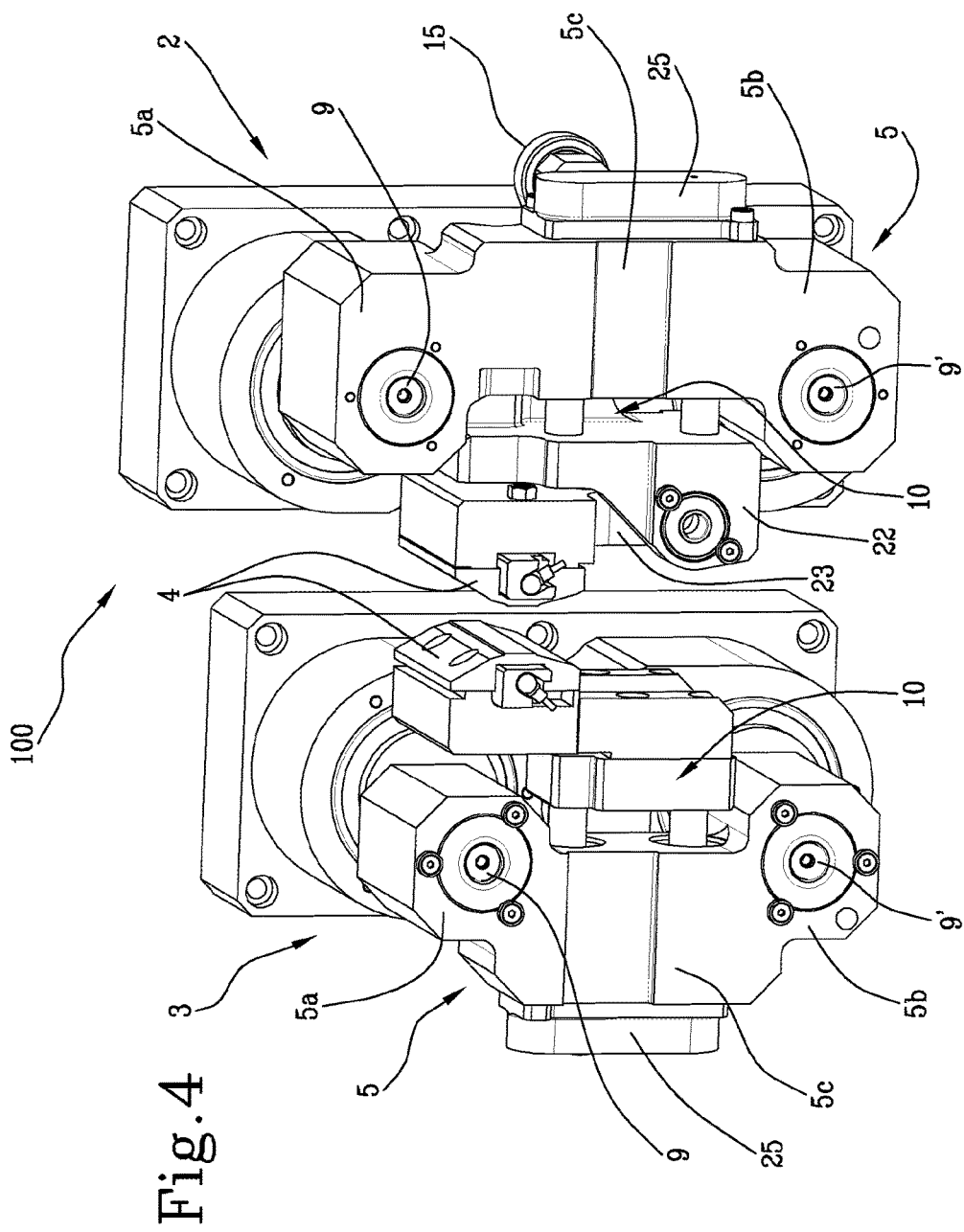
FIG. 4 shows a perspective view of the device for joining filter bags with infusion products according to the invention.

With reference to the accompanying drawings, a joining device according to the invention, labelled 100 in its entirety, is used on machines for packaging filter bags 1 for infusion products, such as, for example, tea, coffee, chamomile and the like.

In this specification, the joining device acts on a continuous tubular strip of filter material from which, through further operating steps, are formed the filter bags, for example of the single-lobed, double-lobed, tetrahedral types etc.

In this case, and purely by way of non-limiting example, the joining device 100 is illustrated during a step of joining a continuous tubular strip S of filter material for joining a stretch of it which defines a top of a filter bag being formed and a bottom of a next filter bag.

As illustrated in FIGS. 2 to 9, the device 100 for joining filter bags 1 for infusion products comprises at least two operating units 2, 3 positioned on opposite sides of the continuous tubular strip S which feeds along a direction A.

Each operating unit 2, 3 comprises a sealing head 4 (for example hot) positioned facing the continuous tubular strip S and a supporting body 5, which supports the sealing head 4.

Moreover, each operating unit comprises two first kinematic units 6 and 6', each having an eccentric rotary system 7, 8, 9, 7', 8', 9'.

Each of the two first kinematic units 6 and 6' is connected to a corresponding first X1 and second X2 axis of movement, of which at least one (for example, the first X1) is motor-driven. The first X1 and the second X2 axis of movement are movable in rotation and in a synchronised fashion with the continuous tubular strip S.

The two first kinematic units 6, 6' are articulated to the supporting body 5 to move the supporting body 5 along a first trajectory T1 which is able to move the sealing head 4 at least between an operating end position in contact with the continuous tubular strip S and a non-operating end position, away from the continuous tubular strip S. Advantageously, as described in more detail below, the first trajectory T1 is substantially circular.

Again as illustrated, the joining device 100 comprises, for each operating unit 2, 3, a carriage 10 associated with the sealing head 4.

The carriage 10 is slidably housed in the supporting body 5 and configured in such a way as to translate, in both directions, relative to the supporting body 5. The carriage 10 is configured to translate in both directions relative to the supporting body 5 along a second trajectory T2 transversal to the feed direction A. Advantageously, as described in more detail below, the second trajectory T2 is substantially rectilinear. Moreover, the second trajectory T2 is substantially perpendicular to the feed direction A.

Each operating unit 2, 3 also comprises a second kinematic unit 11 articulated, at a first end, to a third axis X3 of movement, and at a second end, to the carriage 10.

The second kinematic unit 11 is configured for moving the carriage 10 along the second trajectory T2 in a synchronised fashion with the supporting body 5 which is movable along the first trajectory T1, so as to obtain a movement of the sealing head 4 along a third trajectory T3, resultant from the combination of the first trajectory T1 of the supporting body 5 and of the second trajectory T2 of the sealing head 4 relative to the supporting body 5. The third trajectory T3 comprises at least one rectilinear stretch which is parallel to the feed direction A of the continuous tubular strip S at the operating end position of contact with the sealing head 4.

In other words, the operating units are equipped with two different components movable in a synchronised fashion with each other, through the agency of a kinematic mechanism, which are able to generate a cyclical movement of the sealing head resultant from the combination of the two individual trajectories performed by the supporting body and by the carriage which allows the sealing head to remain in contact with the continuous tubular strip of filter material (following each other) for sufficient time to perform a correct joining on the continuous tubular strip S.

Preferably (see FIG. 5), each first kinematic unit 6 and 6' for moving the supporting body 5 comprises a shaft 7, 7' equipped with a crank 8, 8' with the pin 9, 9' which is eccentric relative to the axis of rotation of the shaft 7, 7'.

It should be noted that each shaft 7, 7' is connected to the corresponding first X1 and second X2 axis of movement (as described in more detail below).

Hereafter, for simplicity of description, only the operating unit 2 is described, since the structure and the components of the operating unit 3 are substantially the same as the operating unit 2. Any differences of the operating unit 3 relative to the operating unit 2 will be described.

Preferably, the second kinematic unit 11 comprises a shaft 12 connected to the third axis X3 of movement.

The shaft 12 is equipped with a crank 13 with a pin 14 is eccentric relative to the third axis X3 of movement.

The second kinematic unit 11 also comprises a connecting rod 15 articulated, at a first end, to the eccentric pin 14 and, at a second end (in P15), to the carriage 10 associated with the sealing head 4.

The second kinematic unit 11 uses a crank-connecting rod system for the independent movement, rectilinear and in both directions, of the carriage 10 relative to the supporting body 5.

The extension of the movement of the carriage 10 depends on the size of the crank 13 and the distance of the pin 14 from the centre of rotation of the crank 13 and also on the length of the connecting rod 15.

In light of this, the third axis X3 of movement is connected by a kinematic mechanism to the first X1 and second X2 axes of movement and configured to rotate the shaft 12 with a direction of rotation V12 (for example, in a clockwise direction for the operating unit 2 and anti-clockwise for the operating unit 3).

In the embodiment illustrated, the shaft 12 rotates in the opposite direction to the directions V7 of rotation of the eccentric rotary systems 7, 8, 9, 7', 8', 9' of the corresponding first X1 and second X2 axis of movement, so as to obtain the third trajectory T3 of the sealing head 4 configured as a "slot".

In alternative embodiments not illustrated, the shaft 12 is not connected in a kinematic fashion to the first X1 and to the second X2 axis of movement, but has autonomous operation and can be rotated in the same direction as the directions V7 of rotation of the eccentric rotary systems 7, 8, 9, 7', 8', 9' of the corresponding first X1 and second X2 axis of movement Describing in more detail the combination of the first trajectory T1 and the second trajectory T2 (see FIGS. 2 and 3), the first trajectory T1 of substantially circular movement of the supporting body 5 tends to move the sealing head 4 towards (and away from) the continuous tubular strip S, whilst the translational movement of the carriage 10 contrasts the moving towards of the sealing head 4 to the continuous tubular strip S, thus obtaining a stretch of trajectory which is rectilinear and parallel to the feed direction A of the continuous tubular strip S. In other words, the combination of the first trajectory T1 and the second trajectory T2 allows the sealing heads 4 to follow and simultaneously come into contact with the continuous tubular strip S for a sufficient time to provide a high quality sealing.

In short, the third trajectory T3 comprises at least one active rectilinear stretch parallel to the feed direction A of the continuous tubular strip S, wherein the sealing heads 4 are in contact with the continuous tubular strip S. Advantageously, the third trajectory T3 comprises at least two rectilinear stretches, of which one active, parallel to the feed direction A of the continuous tubular strip S, wherein the sealing heads 4 are in contact with the continuous tubular strip S, and one inactive, parallel to the feed direction A of the continuous tubular strip S of filter material, wherein the sealing heads 4 are spaced apart from the continuous tubular strip S of filter material.

Figure 5:
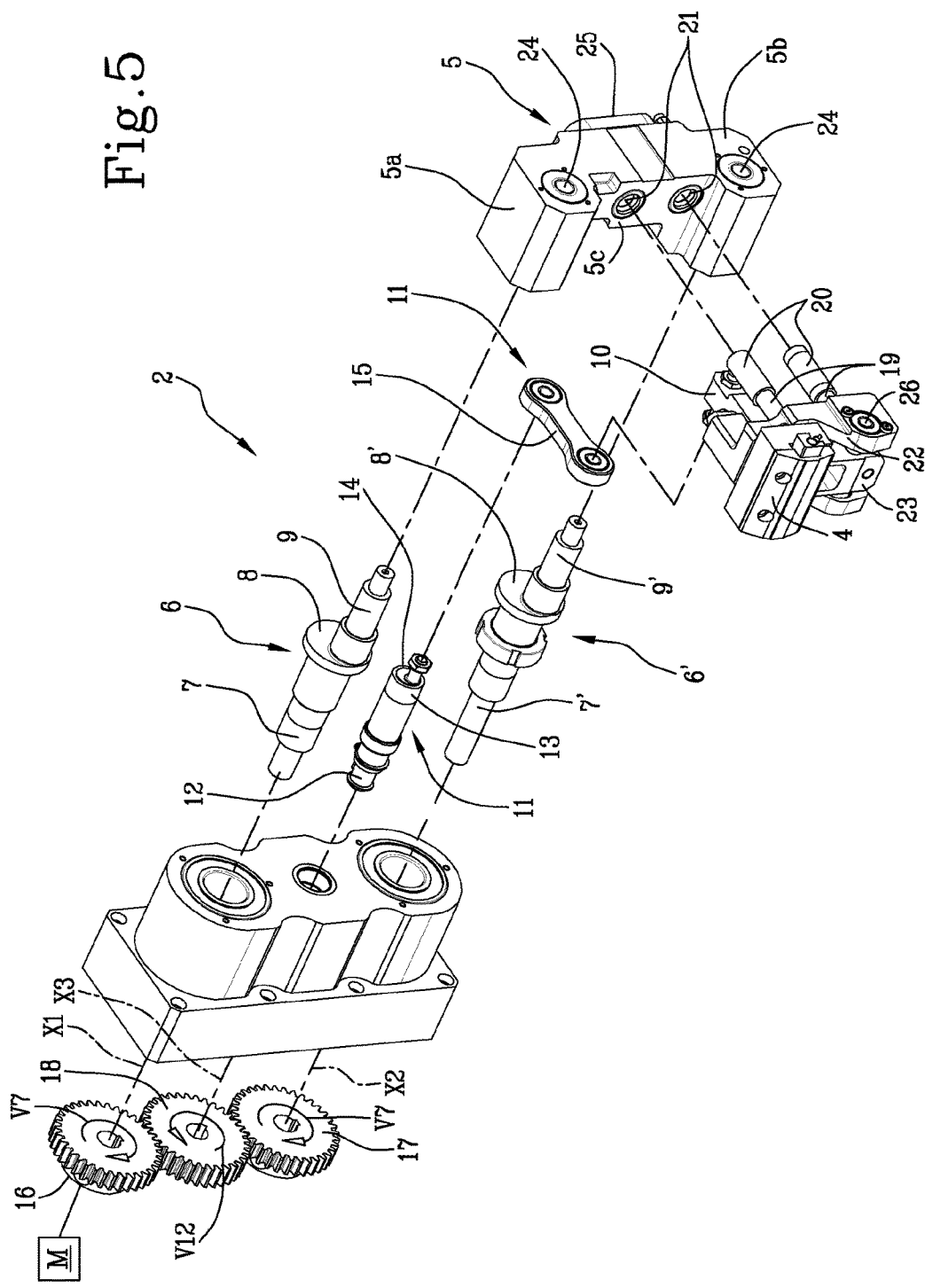
FIG. 5 shows an exploded perspective view of an operating unit forming part of the joining device referred to FIG. 4.

Preferably, the third axis X3 of movement is interposed between the first X1 and the second X2 axis of movement (see FIGS. 2 and 5).

In light of this, each of the axes X1, X2, X3 of movement is equipped with a respective gear wheel 16, 17, 18. More specifically, the first axis X1 is equipped with a first gear wheel 16 and the second axis X2 is equipped with a second gear wheel 17, keyed to a respective shaft (7, 7') of the eccentric rotary systems (7, 8, 9 and 7', 8', 9'). Moreover, the third axis X3 is equipped with a third gear wheel 18 keyed to the shaft 12 of the second articulated kinematic unit 11. Advantageously, the third gear wheel 18 is interposed between, and engaged with, the first gear wheel 16 and the second gear wheel 17.

The kinematic system structured in this way makes it possible to obtain simultaneously:
  the movement of the first kinematic units (6, 6') and the second kinematic unit (11) with a single drive unit (illustrated as a block labelled M in FIG. 5);
  the reversal of the direction of rotation of the second kinematic unit (thanks to the third gear wheel 18 acting as idle wheel);
  maintaining in a synchronised fashion the corresponding movements of the supporting body 5 and of the carriage 10 and the feeding of the continuous tubular strip S of filter material. In short, the sealing heads 4 are stationary relative to the continuous tubular strip S in the active stretch of the third trajectory T3.

In light of this, the first X1, second X2 and third X3 axes of movement are lying in a same plane positioned parallel with the feed direction A of the continuous tubular strip S of filter material.

It should be noted that, merely by way of an example, the continuous tubular strip S illustrated in the drawings has a trend along a vertical direction, but the invention can be used on a continuous tubular strips S feeding along a horizontal direction, or inclined relative to the vertical direction.

According to the embodiment being described, the carriage 10 has a pair of cylinders 19 slidable inside corresponding sleeves 20 housed in through seats 21 made on the supporting body 5 for allowing a rectilinear movement, in both directions, of the carriage 10 relative to the supporting body 5, along the second trajectory T2 transversal to the feed direction A of the continuous tubular strip S of filter material.

The through seats 21 made on the supporting body 5 are closed at one end by a cover 25 which, when necessary, may be removed to allow inspections of the through seats 21 or the sleeves 20.

The above-mentioned connecting rod 15 is articulated to the carriage 10 at a point P15 positioned opposite an end of the carriage 10 which supports the sealing head 4.

In a preferred embodiment, the connecting rod 15 is articulated at the end of the carriage 10, outside the supporting body 5, and forming an extension transversal to the supporting zone of the sealing head 4.

In light of this, at least one of the carriages 10 (in the case illustrated and by way of example only, the one present on the unit labelled 2) has a fork 22 in which is articulated an arm 23 for supporting the sealing head 4.

The fork 22 has a shaft 26 on which is constrained the arm 23 in order to orient or modifying the position of the sealing head 4 if there were clearances to recover with respect to the opposite head 4, or for adjusting two heads 4 replaced and with different sizes.

The other operating unit 3 has the corresponding arm 23 in a single body with the remaining part of the carriage 10, so that the sealing head 4 of the operating unit 3 defines a fixed contact element for the sealing heads 4 of the operating unit 2.

The supporting body 5 has two end portions 5a and 5b having seats 24 for articulation with the corresponding first kinematic units 6, 6' (in particular the corresponding pins 9, 9') and a central portion 5c for partial slidable housing of the carriage 10.

The structure of the supporting body 5 is substantially C-shaped, wherein the central portion 5c has a middle recess for free passage of the transversal extension of the carriage 10 which can translate freely in both directions supported by the pair of cylinders 19.

The device 100 structured in this way operates according to the steps illustrated in FIGS. 6 to 9, in which it may be noted that:

the sealing heads 4 are moved towards the continuous tubular strip S of filter material through a first part of trajectory T1 of the supporting body 5 assisted also by the carriage 10 (curved path), see FIG. 6;

the sealing heads 4 arrive in contact with the continuous tubular strip S of filter material again by means of the movement of the supporting body 5, therefore with first trajectory T1 assisted by the carriage 10, see FIG. 7;

the sealing heads 4 remain in contact with the continuous tubular strip S of filter material under the action of the carriage 10 (second trajectory T2) which allows the contact position to be maintained, whilst there is a lowering and moving away from of the supporting body 5 relative to the tubular strip S of filter material (first trajectory T1); the movement of the supporting body 5 allows the sealing heads 4 to follow the continuous tubular strip S of filter material for a stretch sufficient to perform the joining of the strip S (see FIG. 8), for the active rectilinear stretch of the third trajectory T3;

the increase in the withdrawal of the supporting body 5 (trajectory T1), together with the re-entry movement of the carriage 10 (trajectory T2) determines the moving away of the sealing heads 4 from the continuous tubular strip S of filter material to perform a new raising and start a new joining cycle (see FIG. 9), passing along the inactive rectilinear stretch of the third trajectory T3.

A joining device structured in this way fully achieves the preset aims thanks to the presence of two different components mutually movable and controlled by different kinematic systems which are able to synchronise the movements of the supporting body and of the carriage.

This kinematic combination allows an interaction of two trajectories of movement which are able to maintain the sealing heads in contact with the continuous tubular strip of filter material for a sufficient time to generate a high quality sealing.

This all achieved without having to increase the dimensions of the operating units and with a high level of operational flexibility of the device, which can maintain high levels of quality even with high operating speeds of the machine on which it is installed.

The invention claimed is:

1. A device for joining filter bags for infusion products comprising at least two operating units located on opposite sides of a continuous tubular strip of filter material movable along a feed direction; each of the at least two operating units comprising:

a sealing head positioned facing the continuous tubular strip of filter material;

a supporting body, which supports the sealing head;

two first kinematic units each having an eccentric rotary system and being aligned to a corresponding first axis of movement and second axis of movement, of which at least one of the two first kinematic units is motor-driven, and movable in rotation and in a synchronised fashion with the feeding of the continuous tubular strip the filter material; the first two kinematic units being articulated to the supporting body in such a way as to move the supporting body along a first trajectory which is capable of moving the sealing head at least between an end operating position, in contact with the continuous tubular strip of filter material, and an end non-operating position, away the from the continuous tubular strip of filter material, wherein of the at least two operating units comprises:

a carriage associated with the sealing head; the carriage being slidably connected to the supporting body and configured in such a way as to translate, in both directions, relative to the supporting body, along a second trajectory, transversal to the feed direction;

a second kinematic unit articulated, at a first end, along a third axis of movement, and, at a second end, to the carriage; the second kinematic unit being configured for moving the carriage in a synchronised fashion with the supporting body, so as to obtain a movement of the sealing head along a third trajectory, resultant from a combination of the first trajectory and the second trajectory, having at least one active rectilinear stretch parallel to the feed direction of the continuous tubular strip of filter material, wherein the sealing head is in contact with the continuous tubular strip of filter material.

2. The device according to claim 1, wherein the second kinematic unit comprises a shaft aligned to the third axis of movement and including a crank with a pin which is eccentric relative to the third axis of movement; the second kinematic unit also comprising a connecting rod articulated, at a first end, to the pin and, at a second end, to the carriage associated with the sealing head.

3. The device according to claim 2, wherein the connecting rod is articulated to the carriage at a point positioned opposite an end of the carriage which supports the sealing head.

4. The device according to claim 2, wherein the third axis of movement is interposed between the first axis of movement and the second axis of movement; and further comprising a first gear wheel aligned to the first axis of movement and a second gear wheel aligned to the second axis of movement, the first gear wheel and the second gear wheel being keyed to respective shafts of the eccentric rotary systems; and a third gear wheel keyed to the shaft of the second kinematic unit.

5. The device according to claim 2, wherein the shaft of the second kinematic unit aligned to the third axis of movement is connected by a kinematic mechanism to the eccentric rotary systems of the corresponding first axis of movement and second axis of movement, the kinematic mechanism configured to rotate the shaft of the second kinematic unit with a direction of rotation opposite directions of rotation of the eccentric rotary systems of the corresponding first axis of movement and second axis of movement, so as to obtain the second trajectory of the carriage, which combined with the first trajectory, configured in a circular fashion, of the supporting body provides the third trajectory of the sealing head configured as a slot.

6. The device according to claim 1, wherein the carriage has a pair of cylinders slidable inside corresponding sleeves housed in through seats made on the supporting body for allowing a rectilinear movement, in both directions, of the carriage relative to the supporting body; the sleeves being associated stably with the supporting body.

7. The device according to claim 1, wherein the first, second and third axes of movement lie in a same plane positioned parallel to the feed direction of the continuous tubular strip of filter material.

8. The device according to claim 1, wherein the supporting body has two end portions having seats for articulation with the corresponding kinematic units and a central portion for slidably housing the carriage.

* * * * *